United States Patent [19]

Citelli

[11] 4,359,861

[45] Nov. 23, 1982

[54] GAS TURBINE

[75] Inventor: Charles Citelli, Lexington, N.Y.

[73] Assignee: John Musacchia, Marathon, Fla.

[21] Appl. No.: 115,441

[22] Filed: Jan. 25, 1980

Related U.S. Application Data

[63] Continuation-in-part of Ser. No. 870,075, Jan. 17, 1978.

[51] Int. Cl.³ .............................................. F02C 3/10
[52] U.S. Cl. ................................. 60/39.15; 60/39.37; 60/736
[58] Field of Search .................. 60/39.37, 736, 39.15; 431/208; 219/300, 301; 417/569

[56] References Cited

U.S. PATENT DOCUMENTS

| | | | |
|---|---|---|---|
| 1,519,395 | 12/1924 | Clench | 219/301 |
| 1,757,855 | 5/1930 | Chilowsky | 60/736 |
| 2,593,316 | 4/1952 | Kraft | 417/569 |
| 2,690,648 | 10/1954 | Pearce et al. | 60/39.37 |
| 3,589,314 | 6/1971 | Tratz et al. | 431/208 |
| 3,707,074 | 12/1972 | Meyer | 60/736 |
| 3,738,105 | 6/1973 | Buchelt | 60/39.37 |
| 3,844,113 | 10/1974 | Lockwood | 60/39.15 |
| 3,949,548 | 4/1976 | Lockwood | 60/39.15 |
| 4,047,880 | 9/1977 | Caldarelli | 431/208 |

*Primary Examiner*—Robert E. Garrett
*Attorney, Agent, or Firm*—John Maier, III

[57] ABSTRACT

A gas turbine utilizing the spontaneous ignition of preheated fuel, said gas turbine including a series of combustion chambers supplied with fuel from pumping and preheating subassemblies.

11 Claims, 9 Drawing Figures

FIG. 1

GAS TURBINE

RELATED APPLICATIONS

This application is a continuation-in-part of application Ser. No. 870,075 filed Jan. 17, 1978.

BACKGROUND OF THE INVENTION

This invention relates generally to the pumping of fuel for a gas turbine into a preheating chamber, heating the fuel and supplying it to a series of circumferentially-located combustion chambers where further heating of the fuel occurs, resulting in spontaneous ignition of the fuel.

Due to the increasing price of fuel, a turbine which could burn alcohol as well as other fuels including fuels containing water, would be highly desirable. The burning of even wet fuels would make possible the safe storage and transportation of fuels since the presence of water in a fuel retards explosion and fire. Generally the fuel for gas turbines is ignited by a device such as a spark plug.

The Meyer Patent, U.S. Pat. No. 3,707,074, discloses the general concept of preheating fuel to avoid the necessity of igniting the fuel. That patent, however, fails to disclose an apparatus for preheating the fuel and supplying it to a turbine as is taught herein. The Carso Patent, U.S. Pat. No. 3,657,883 discloses a cluster of combustion chambers as does also the Hussey Patent, U.S. Pat. No. 3,169,367. The Cornell Patent, U.S. Pat. No. 3,949,775 teaches the use of a circumferential fuel supply and distribution system.

There is a need, however, for a device which could utilize any fuel, even a wet fuel, which will ignite only at a high temperature.

It is, therefore, desirable to design a turbine with a preheating system for the spontaneous ignition of the turbine fuel and which is able to handle any fuel and that is reliable and easily repaired and inexpensive to manufacture and service. Also, it is desirable to develop a unique turbine system which includes a power source for auxiliary units separate from the main power drive.

SUMMARY OF THE INVENTION

This invention provides an apparatus for the combustion of fuel in a multiplicity of combustion chambers by first heating the fuel to a spray or mist in a preheater and then supplying the fuel as a spray or mist to the multiplicity of combustion chambers where further heat is provided along with the required air for combustion. The products of combustion from the combustion chambers are injected against two independently mounted impeller wheels, one supplying power for the main drive and the other for the operation of the auxiliary units of the turbine.

Fuel is pumped from a fuel source by means of a push and pull motor. A spring-loaded valve assures the movement of the fuel to a preheating assembly and prevents any backward flow of preheated fuel into the fuel source. The preheating assembly includes a cylindrical chamber with a perforated tube located concentrically therein wrapped with a heating coil. The fuel passes through the perforations in the tube and is then forced through a supply chamber to a circular ring located concentrically about the main axis of the turbine. A series of combustion chambers are located concentrically about the main axis of the turbine. About the combustion chambers, a compressor is located which supplies air under pressure to the combustion chambers. The preheated fuel flows from the circular ring into the combustion chambers where the fuel and air mixture moves through a continuously narrower passageway formed by a conical tube with heating coils wrapped about it. The fuel and air mixture are continuously heated by the coil-wrapped conical tube. As the temperature of the air and fuel mixture increases, spontaneous combustion occurs. The products of combustion then pass into a combustion header having two nozzles. One nozzle directs the products of combustion against an upper impeller wheel and the other nozzle directs the products of combustion against a lower impeller wheel. The lower impeller wheel is the main impeller wheel for the prime moving purposes. The upper impeller wheel, which is independently mounted from the lower impeller wheel by a split in the axis of the turbine, is used to provide the auxiliary power necessary to operate the turbine.

DETAILED DESCRIPTION OF THE INVENTION

Figure 1:
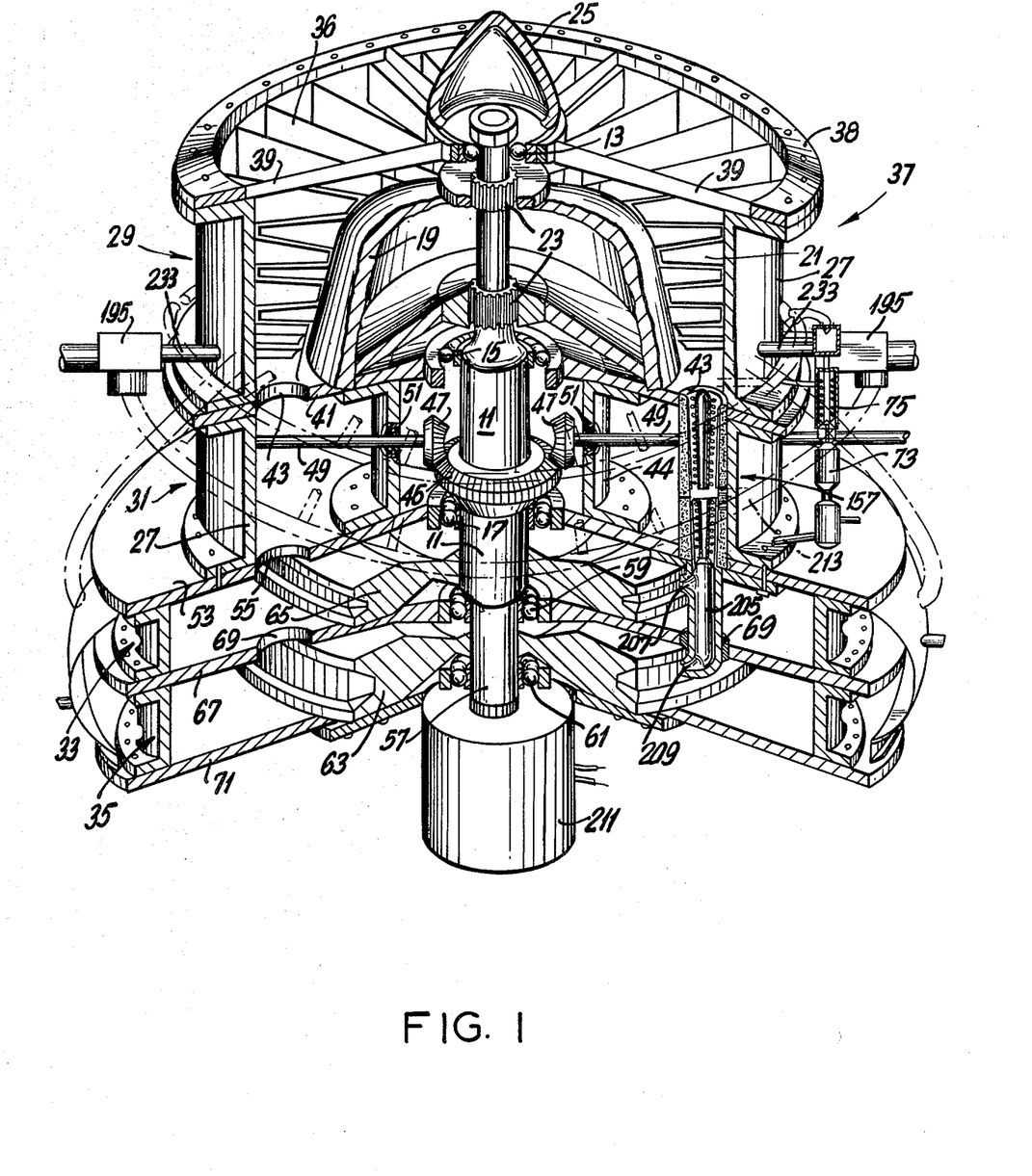
FIG. 1 is a perspective view of the turbine partially broken away.

Referring now to FIG. 1 of the drawings, an upper drive shaft 11 is shown centrally located within the turbine. The upper drive shaft 11 is mounted on upper bearings 13 and on middle bearings 15 and lower bearings 17. Rigidly secured to the upper drive shaft 11 is a vane dome 19. Extending from the vane dome 19 are a series of vanes 21 which are secured to and rotate with the vane dome 19. The vane dome 19 is rigidly secured to the upper drive shaft 11 by means of a pair splines 23 located at both the upper and lower portions of the vane dome 19. A collar 25 is mounted on the extreme upper end of the upper drive shaft 11 adjacent the upper bearing 13. A generally conical casing encloses the outside end of the upper drive shaft 11 where the collar 25 is located. The gas turbine is enclosed within a casing 27. The casing has four main sections, namely a compressor section 29, a combustion section 31, an auxiliary impeller section 33 and a main impeller section 35. Stationary vanes 36 extend from the compressor section 29 of the casing 27 and interweave with rotating vanes 21 to form an air compressor 37. An upper flange 38 is mounted on the compressor section 29 of the casing 27 and includes support members 39 extending from the flanges 38 to the upper bearing 13.

A dividing member 41 is mounted between the compressor section 29 and the combustion section 31 of the casing 27 and includes a series of segments with insert pieces (not shown) to form openings 43 located immediately inside the casing 27 and in direct communication with the air compressor 37. Concentrically located within the combustion section 31 of the casing 27 is an inner casing 44. Mounted on the upper drive shaft 11 adjacent the inner casing 44 is a large bevel gear 45. A pair of smaller bevel gears 47 engage the large bevel gears 45 and are connected to shafts 49 mounted on bearings 51 within the inner casing 44. A dividing member 53 is secured to the bottom of both the inner casing 44 and the combustion section 31 of the casing 27.

The dividing member 53 is segmented (now shown) as is the dividing member 41. The dividing member 53 extends beyond the radius of the compressor section 29 and the combustion section 31 which have the same radius. The auxiliary impeller section 33 and the main impeller section 35 each have the same radius which is larger than the compressor section 29 and the combustion section 31. The dividing member 53 has openings 55 aligned with the openings 43, both openings 43, 55 being immediately inside the combustion section 31 of the casing 27.

Mounted below the upper drive shaft 11 is a lower drive shaft 57 mounted on upper bearings 59 and lower bearings 61. A lower impeller wheel 63 is connected to the lower drive shaft 57. An upper impeller wheel 65 is mounted on the upper drive shaft 11 immediately above the upper bearing 59. A dividing member 67 is located between the auxiliary impeller section 33 and the main impeller section 35. The dividing member 67 has openings 69 aligned with the openings 55 and the openings 43. A base member 71 is located at the outside of the main impeller casing 35 parallel with the dividing members 41, 67.

Figure 2:
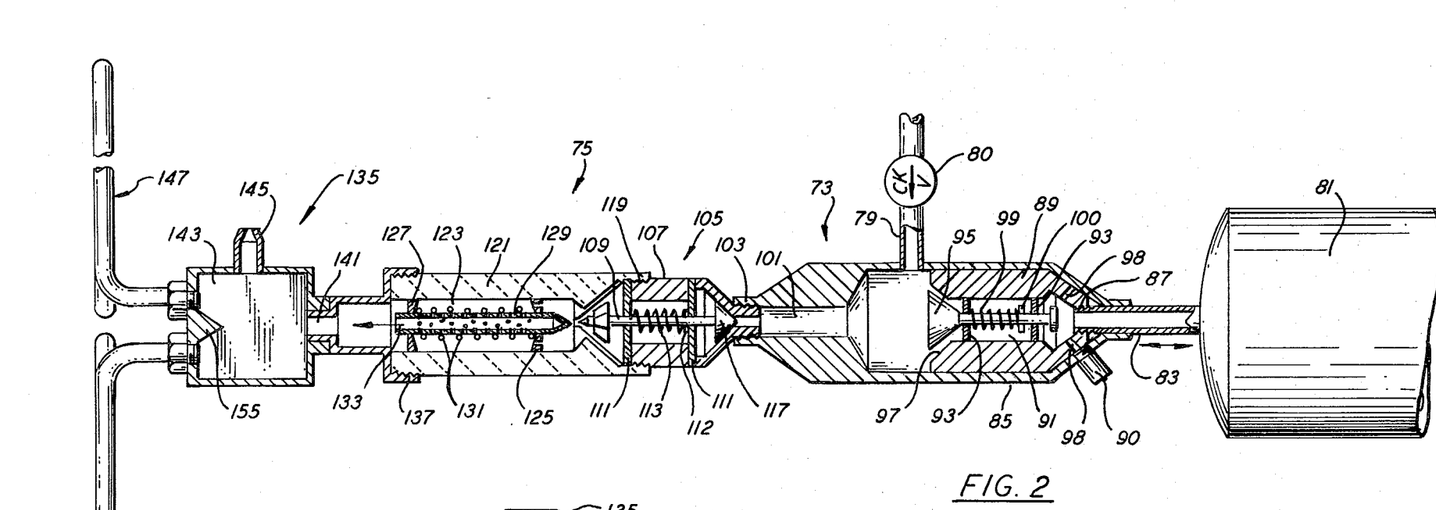
FIG. 2 is a cross-sectional view of the pumping and preheating system along with the circular ring rotated ninety degrees from the vertical, as depicted in FIG. 1, to the horizontal.

Mounted outside of the casing 27, as best seen in FIG. 1 are the pump assembly 73 and preheater assembly 75 which are both shown in greater detail in FIG. 2.

Referring now to FIG. 2, fuel from a fuel supply not shown flows through an inlet tube 79 into the pumping assembly 73. A check valve 80 is located in the inlet tube 79. Connected to the drive end of the pumping assembly 73 is a push-pull motor 81 which moves a shaft 83 back and forth. The shaft 83 is slidably fitted through the casing 85 of the pumping assembly 73 and is connected by a thread 87 to a slidable inner core 89. A one-way air valve 90 permits air to enter behind the inner core 89 to prevent the formation of a vacuum. The inner core 89 is cylindrical and tapers at its drive end here it is connected to the shaft 83 of the push-pull motor 81. A cylindrical opening 91 is concentrically located in the inner core 89. Supports 93 are located in the cylindrical opening 91 to support a spring-loaded tappet valve 95 mounted on a valve stem 96 within the cylindrical opening 91. The cylindrical opening 91 has a beveled opening 97 opposite from the point connected to the shaft 83 so as to seat properly the tappet valve 95. The inner core 89 has orifices 98 adjacent the shaft 83 connecting the outside of the inner core 89 with the cylindrical opening 91. As the push-pull motor 81 moves the inner core 89 away from the push-pull motor 81 within the casing 85, the tappet valve 95 is held against the inner core 89 by a spring 99 and the pressure of the fuel against the tappet valve 95. The spring 99 is mounted under compression between the upper support of the supports 93 and a washer 100 secured to the valve stem 96.

As the inner core 89 moves back toward the push-pull motor 81, fuel enters the pump assembly 73 through the inlet 79. The check valve 80 permits the fuel to flow into the pump assembly 73. When the inner core 89 moves forward, the check valve 80 closes and the fuel is forced outwardly through a concentric passageway 101.

There is always a possibility, particularly with continuous operation, that fuel will seep between the inner core 89 and the casing 85. Were this to occur, the inner core could not seat toward the push-pull motor 81. For this reason, the orifices 98 are provided which permit such trapped fuel to enter the cylindrical opening 91 thereby releasing such fuel from between the inner core 89 and the casing 85. Should sufficient fuel build up within the cylindrical opening 91, the tappet valve 95 is forced open to release the fuel during the return movement of the inner core 89 toward the push-pull motor 81.

Downstream from the pumping assembly 73 and connected to it by a thread 103 is a check valve assembly 105. The check valve assembly 105 includes a casing 107 with a double-action, spring-loaded valve 109 located within it. The double-acting, spring-loaded valve 109 is supported by a pair of cross members 111 located within the check valve assembly 105. The spring 113 of the double-acting, spring-loaded valve 109 extends between the upper one of cross members 111 and a washer 112 fixedly mounted on the valve 109. The spring 113 forces the washer 112 against the lower one of the cross members 111. Both the interior top and bottom of the back valve assembly 105 are conical so that the double-action, spring-loaded valve 109 will seat properly. The upper valve 115 of the double-action, spring-loaded valve 109 is grooved so as not totally to prevent the flow of fuel. In this way, as the fuel is forced by the pumping assembly 73 into the check valve assembly 105, the spring-action will permit the fluid to flow through the lower valve 117. Should pressure develop downstream of the check valve assembly 105, the pressure will force back against both the upper valve 115 and the lower valve 117 forcing the lower valve 117 closed. In this way, a flow backward of heated fluid from the preheating assembly 75 into either the pumping assembly 73 of the fuel supply will be prevented. The upper end of the check valve assembly 105 is connected by a thread 119 to the lower end of a preheater assembly 75. The preheater assembly 75 has a cylindrical casing 121 of ceramic to avoid heat loss. A cylindrical passageway 123 is concentrically located through the center of the casing 121 of the preheater assembly 75. A lower bracket 125 and an upper bracket 127 serve to support a hollow perforated tube 129. The upper bracket 127 is solid to block the flow in the upper portion of the concentric opening. The lower bracket 125 is perforated to permit the flow of fuel. The hollow perforated tube 129 is not perforated below the lower bracket 125. In this way, the fuel flows through the lower bracket 125 and is forced to flow through the perforations of the hollow tube 129 since the upper bracket 127 is solid. Electrical heating wires 131 are located about the hollow perforated tube 129. The heating wire is connected through the ceramic casing 121 to an electrical supply source (not shown). The fuel is heated by the electrical heating wires 131 as the fuel flows through the perforations in the hollow perforated tube 129 into the center of the tube 129 and out the open end 133 of the tube 129.

A reservoir assembly 135 is connected by a thread 137 to the top of the preheater assembly 75. The reservoir assembly 135 includes an initial chamber 139 where the preheated fuel is received as it leaves the preheater assembly 75. The fuel then flows through a passageway 141 of reduced size to the main reservoir compartment 143. An emergency relief tube 145, for escape of preheated fuel, is located in the side of the main reservoir compartment 143.

Figure 3:
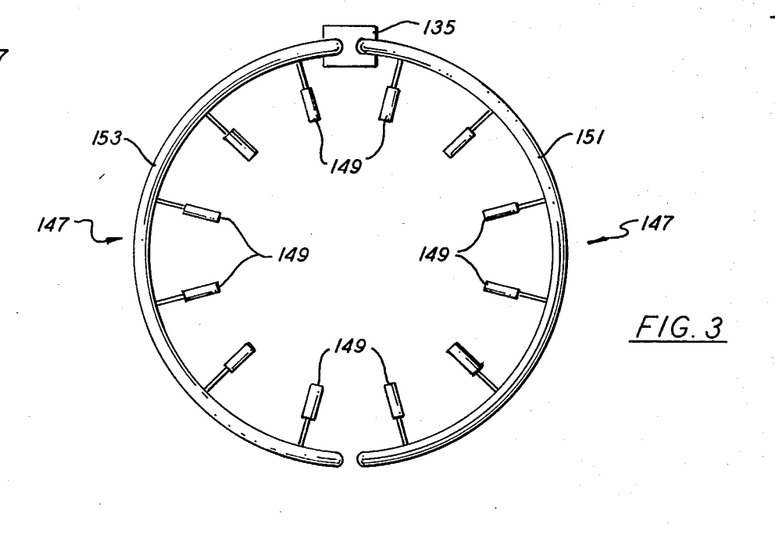
FIG. 3 is a top view of the circular ring for supplying the preheated fuel to the combustion chambers.

Connected to the top of the reservoir assembly 135 is a ring-shaped header 147 best shown in FIG. 3. Outlets 149 from the ring-shaped header 147 are directed radially inwardedly. Check valves 150 which are normally open are located downstream of the outlets 149, to prevent any back flow of ignited fuel. The ring-shaped header 147 includes two semi-circular tubes 151, 153. The ring-shaped header 147 is split at the extreme semi-circular location from the reservoir assembly 135. A V-shaped flow divider 155, within the reservoir assembly 135, between the outlets to the semi-circular tubes 151, 153, divides the fuel flow to the semi-circular tubes 151, 153. Each radial outlet 149 supplies preheated fuel to a combustion assembly 157.

As is best seen in FIG. 1, a series of combustion assemblies 157 are concentrically located about the upper drive shaft 11 of the turbine directly below the air compressor assembly 37.

Figure 5:
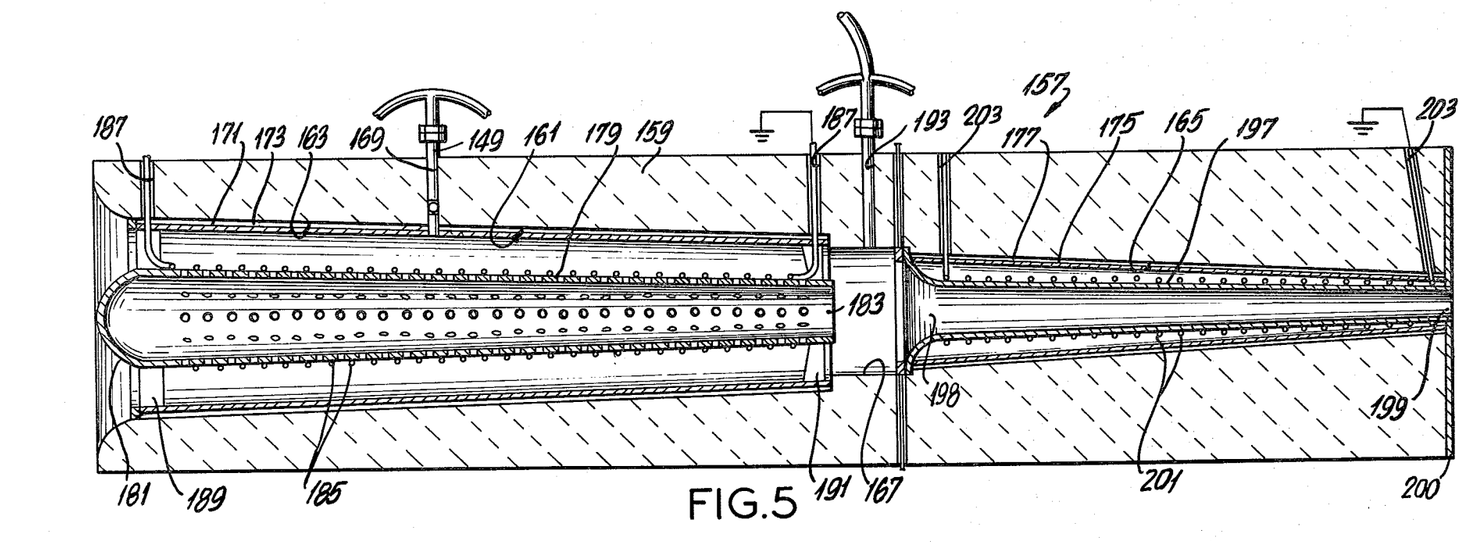
FIG. 5 is a sectional plan view of the upper portion of the combustion chamber rotated ninety degrees from the vertical, as depicted in FIG. 1, to the horizontal.
Figure 6:
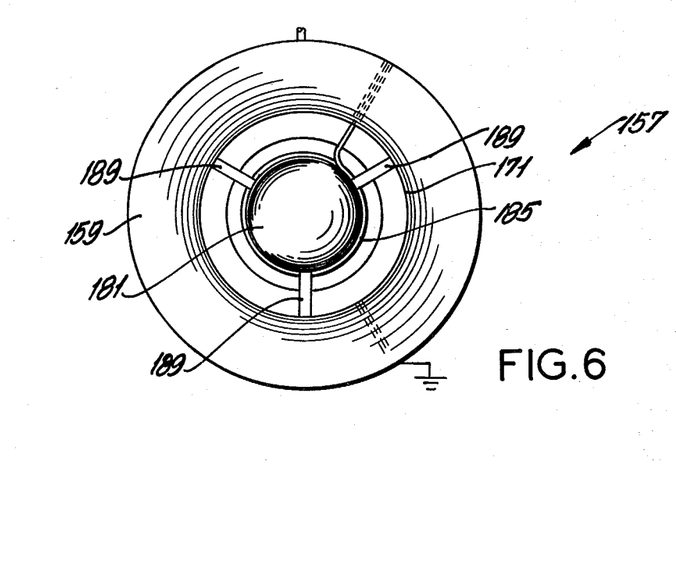
FIG. 6 is a top plan view of the combustion chamber shown in FIG. 5.

Reference is now made to FIGS. 5 and 6 which show a combustion assembly 157. Each combustion assembly 157 is formed from a cylindrical ceramic casing 159. A conical opening 161 is concentrically located through the cylindrical ceramic casing 159 from top to bottom but with an upper portion 163, a lower portion 165 and a mid-portion 167. The upper portion 163 has a gradually reduced diameter as the opening extends from the top of the combustion assembly 157 to the mid-portion 167. The mid-portion 167 is circular and comparatively short compared to the upper portion 163 and the lower portion 165. The lower portion 165 tapers inwardedly to a narrow opening. The fuel enters the combustion assembly 157 from its respective radial outlet 149 substantially midway at an inlet 169 of the upper portion of the combustion assembly 157. An upper metallic sleeve 171 lines the upper portion 163 of the combustion assembly 157. The upper metallic sleeve 171 has the same configuration as the upper portion 163 but is slightly inside the upper portion 163 to provide a space 173 preferably lined with an insulating material such as ashestoes for a heat protection barrer. Likewise, the lower portion 165 is lined with a lower metallic sleeve 175 which has the same configuration as the lower portion 165 but is slightly inside the lower portion 165 to form a space 177 also preferably lined with an insulating material such as asbestoes.

Suspended inside the upper sleeve 171 is a perforated tubular member 179 with a sealed domed top 181 and a open bottom 183. The perforated tubular member 179 is also of gradually reducing diameter so that it parallels the upper metallic sleeve 171 of the upper portion 163 but well inside the upper metallic sleeve 171. Electrical heating wires 185 are wrapped about the perforated tubular member 179 and enter the combustion assembly 157 through openings 187 in the ceramic casing 159. A upper bracket 189 in the form of three support members holds the upper end of the perforated tubular member 179 while permitting the flow of air from the air compressor 37 between the sealed domed top 181 and the upper metallic sleeve 171. The electrical heating wire 185 is energized to supply heat and as the preheated fuel is ejected into the opening 169 and about the wire 185 and into the perforated tubular member 179 through the perforations further heat is supplied to the fuel. A lower bracket 191 supports the lower end of the perforated tubular member 179 and also prevents fuel exiting outside the perforated tube 179. The lower bracket 191 thereby forces the fuel through the perforations into the perforated tubular member 179 and to exit through the lower end 183 of the perforated tubular member 179 into the mid-portion 167 of the combustion assembly 157. An emergency passage 193 is located at the mid-portion 167 and is connected to a safety valve assembly 195 to the subsequently explained.

In the lower portion 165 of the combustion assembly 157, a lower tubular member 197 is provided which is not perforated. The lower tubular member 197 has a curved opening 198 at the top and then gradually tapers downwardly to a lower opening 199. In this way the curved opening 198 extends from the casing 159 and the lower tubular member 197 and blocks the space between the lower metallic sleeve 175 and the lower tubular member 197. In this way the curved opening 198 supports the lower tubular member 197. The lower tubular member 197 is not parallel to the lower metallic sleeve 175 but is more restrictive compared to the sleeve 175 at the top than at the bottom opening 199. An electrical heating wire 201 is wrapped about the lower tubular member 197 to supply further heat. The electrical heating wire enters and leaves the casing 159 through openings 203. The heated fuel mixed with air is forced downwardly under the force of the compressor through the lower opening 199 of the lower tubular member 197. The lower tubular member 197 is supported at the lower opening 199 by the plate 200 which blocks the space between the lower metallic sleeve 175 and the lower tubular member 197.

In the preheater assembly the pressurized fuel is preheated to a temperature below its flash point temperature at the ambient pressure of said pressurized fuel. Further heating of the pressurized fuel occurs in each of said combustion assemblies to heat the pressurized fuel to at least its flash point temperature when in combination with the pressurized air supplied at the ambient pressure to said combustion assemblies to support combustion of the pressurized fuel.

Each combustion assembly 157 is mounted in a set of openings 43, 55, 60 directly on top of a manifold 205 having an upper nozzle 207 and a lower nozzle 209. The upper nozzle 207 is directed at the upper impeller wheel 65 and the lower nozzle is directed at the lower impeller wheel 63. As has been previously pointed out, the upper impeller wheel 65 drives the upper drive shaft 11 which in turn operates the air compressor 37 and through the bevel gears 45, 47 operates auxiliary equipment such as electrical power sources (not shown). The lower impeller wheel 63 operates a hydraulic unit 211.

As has been previously pointed out, in the mid-portion 167 of the combustion assembly 157 there is an emergency passage 193. The emergency passage 193 is connected to two semi-circular headers 213, (FIG. 1) each connected to a safety valve assembly 195.

Figures 4, 7, 8, 9:
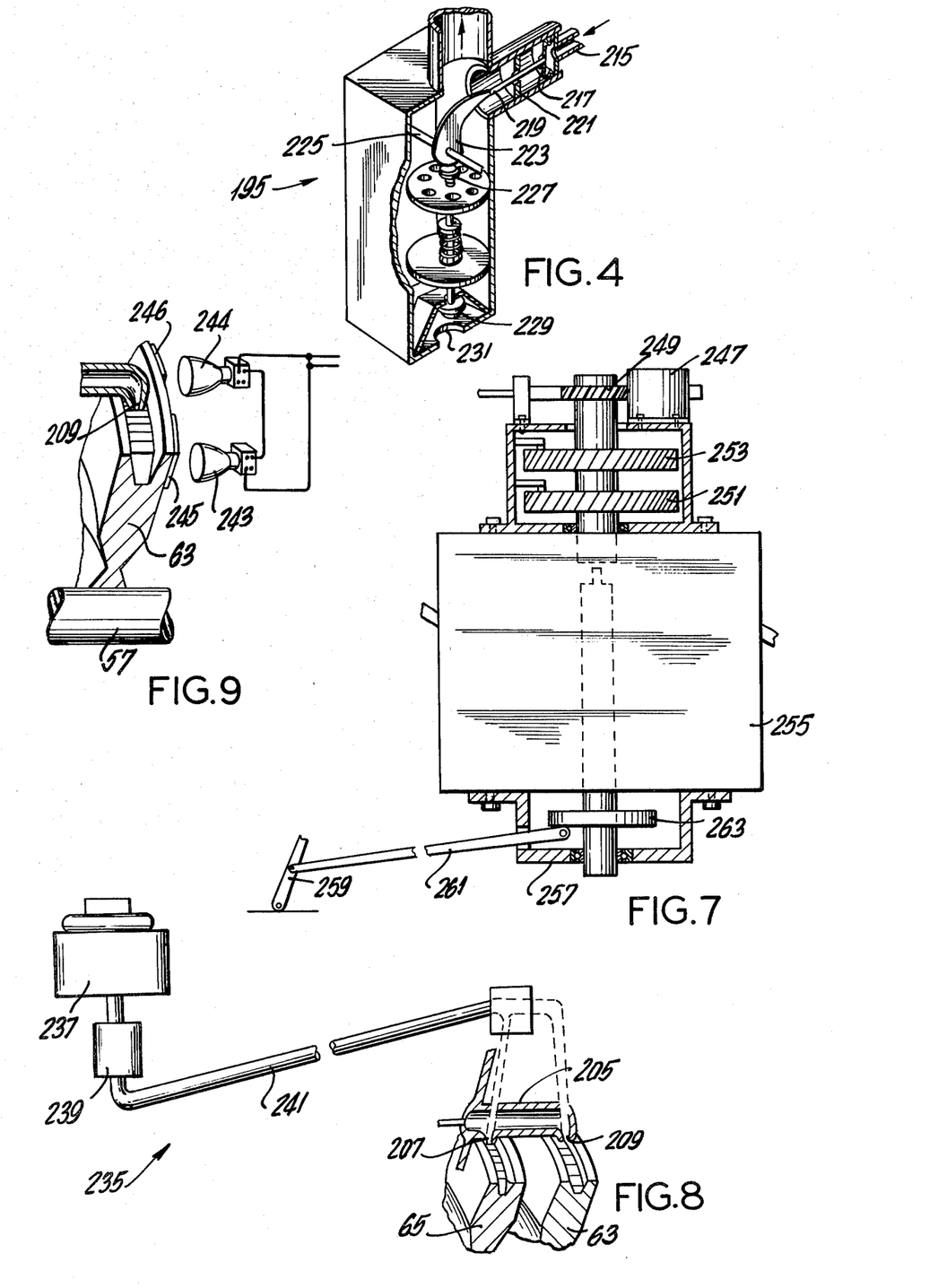
FIG. 4 is a perspective view, partially broken away, showing an excess pressure relief valve.
FIG. 7 is the cross-sectional side elevation of the control mechanism.
FIG. 8 is a schematic view of a compressed air source for operating the turbine at start-up.
FIG. 9 is a schematic view showing the speed control circuitry and mechanism for the turbine.

The details of the safety valve assembly 195 can best be seen in FIG. 4. Each semi-circular header 213 is connected to the inlet 215 of one safety valve assembly 195. When the pressure of the heated fuel within the combustion assembly 157 reaches an excessive level, it presses against a piston 217 included within a bellows 218. The piston 217 is connected to a rod 219 slidably mounted in a support 221. Movement of the piston 217 actuates a switch (not shown) which shuts off the push-pull motor 81 and the electrical heating wires 131 in the preheater assembly 75 and the electrical heating wires 185, 201 in the combustion assembly 157. The opposite end of the rod 219 from the piston is connected to a cam 223 which is pivotally mounted on a shaft 225. The cam 223, when rotated on the shaft 225, permits a spring-loaded plunger 227 to move toward the cam 223. The movement of the spring-loaded plunger 227 raises a valve 229 from an opening 231 at the bottom of the safety valve assembly 195. A conduit 233 (FIG. 1) is connected to the outlet 231 (FIG. 4) where the valve 229 sits and connects the outlet 231 to the base of the air compressor 37. In this manner, the safety valve assembly 157 permits a quick escape of the compressed air from the air compressor 37 causing the turbine to shut down promptly and safely.

As seen in FIG. 8, the turbine can be started by means of a compressed air auxiliary unit 235. This can be used in emergency operation and also is used to start the turbine to bring it up to speed. Since the turbine will not operate without the air compressor 37 supplying compressed air to the combustion assemblies 157, an internal combustion engine 237 is connected to a compressor 239 which, through a conduit 241, supplies compressed air to the manifolds 205 and the nozzles 207, 209. In this way, compressed air is placed against the lower impeller wheel 63 and upper impeller wheel 65 resulting in operation of the turbine to a sufficient point that the air compressor 37 produces adequate compressed air for the combustion assemblies 157.

To control the speed of the turbine, a pair of stroblights 243, 244 (FIG. 9) are projected on preset marks 245, 246 on the lower impeller wheel 63. A predetermined speed of rotation for the lower impeller wheel 63 is set in to the circuit. As the load on the lower impeller wheel 63 is placed is increased, the lower impeller wheel 63 slows down and the stroblights can cause a reverse current relay 247 to actuate a worm-gear drive 249. The lower and upper impeller wheels 63, 65 are heavy wheels having the characteristics of fly wheels so as to impart momentum even when there is a reduction in the gases injected in them. The worm-gear drive 249 changes the resistance of variable resistors 251, 253. The variable resistors 251, 253 are located in the circuits of the electrical heating wires 131, 185, 201 and the push-pull motor 81 and increases the resistance of such circuits thereby increasing the heat supplied to the fuel in the preheater assembly 75 and the combustion assembly 157. Similarly, there is an increase in the amount of fuel being supplied by increased action of the push-pull motor 81.

The fluid from the hydraulic unit 211 flows to a control valve 255 actuated by a throttle assembly 257. The throttle assembly 257 includes an accelerator pedal 259 connected by a connecting rod 261 to a rotatory slide control 263 which controls the pressure of the hydraulic fluid to hydraulic drive unit being actuated.

Accordingly, while the preferred embodiment of the present invention has been depicted and described, it will be appreciated by those skilled in the art, that many modifications, substitutions and changes may be made thereto, without departing from the invention's fundamental theme.

I claim:
1. A gas turbine comprising:
a turbine enclosure assembly;
a preheater assembly;
a plurality of combustion assemblies mounted within and supported by said turbine enclosure assembly;
compressor means mounted within said turbine enclosure assembly for supplying pressurized air to said combustion assemblies;
a pumping casing having a hollow interior and being elongated with a drive opening at one end and an exit opening at its other end and a fuel supply opening substantially midway between the drive opening and the exit opening;
a core slidably mounted within the hollow interior of said pumping casing and having a drive end and an exit end;
a shaft connected to the drive end of said core and slidably mounted in the drive opening of said pumping casing;
means for moving said shaft back and forth to force the exit end of said core against fuel supplied through said fuel supply opening and force pressurized fuel out said exit opening of the pumping case;
means connected to both said pumping casing and said preheater assembly for coveying said pressurized fuel from said exit opening of the pumping casing to said preheater assembly, said means for conveying including a valve casing with an inlet valve and seat adjacent said pumping casing and an exit valve and seat adjacent said preheater assembly, said preheater assembly including means to preheat the pressurized fuel to a temperature below its flash point temperature at the ambient pressure of said pressurized fuel;
means for conveying pressurized fuel from said preheater assembly to said plurality of combustion assemblies, each of said combustion assemblies including means for the further heating of said pressurized fuel to at least its flash point temperature to support combustion of the fuel in combination with the pressurized air supplied to said combustion assemblies;
a drive shaft means rotatably mounted within said turbine enclosure assembly, said compressor means being driven by said drive shaft means;
an impeller means mounted on said drive shaft means; and
a plurality of manifold and nozzle means each connected to a combustion assembly and mounted within said turbine enclosure assembly to receive the pressurized gaseous products of combustion from said plurality of combustion assemblies and direct said gaseous products of combustion against said impeller means to cause said impeller means to drive said drive shaft means.

2. A gas turbine comprising:
a turbine enclosure assembly;
a preheater assembly;
a plurality of combustion assemblies mounted within and supported by said turbine enclosure assembly;
compressor means mounted within said turbine enclosure assembly for supplying pressurized air to said combustion assemblies;
a pumping assembly for supplying pressurized fuel for said preheater assembly, said preheater assembly including means to preheat the pressurized fuel to a temperature below its flash point temperature at the ambient pressure of said pressurized fuel, each of said combustion assemblies including means for the further heating of the pressurized fuel to at least its flash point temperature to support combustion of the fuel in combination with the pressurized air supplied to said combustion assemblies;

a valve casing connected to both said pumping assembly and said preheater for conveying the pressurized fuel from said pumping assembly to said preheater assembly, said valve casing having a passageway through it and said valve casing having a valve seat adjacent said pumping assembly and a valve seat adjacent said preheater assembly;

a valve stem;

bracket means to support said valve stem within said valve casing with one end adjacent said pumping assembly and one end adjacent said preheater assembly;

a spring mounted about said valve stem and supported by said bracket means, said spring adapted to force said valve stem toward said pumping assembly;

an inlet valve mounted on the end of said valve stem adjacent said pumping assembly and adapted to seat in the valve seat at the end of the passageway adjacent the pumping assembly;

an exit valve mounted on the end of said valve stem adjacent said preheater assembly and adapted to seat in the valve seat at the end of the passageway adjacent the preheater assembly, said exit valve being grooved to permit the flow of pressurized fuel when said exit valve is seated;

means for conveying pressurized fuel from said preheater assembly to said plurality of combustion assemblies;

a drive shaft means rotatably mounted within said turbine enclosure assembly, said compressor means being driven by said drive shaft means;

an impeller means mounted on said drive shaft means; and a plurality of manifold and nozzle means each connected to a combustion assembly and mounted within said turbine enclosure assembly to receive the pressurized gaseous products of combustion from said plurality of combustion assemblies and direct said gaseous products of combustion against said impeller means to cause said impeller means to drive said drive shaft means.

3. A gas turbine comprising:

a turbine enclosure assembly;

a preheater assembly;

a plurality of combustion casings mounted within and supported by said turbine enclosure assembly, each combustion casing having an upper end and a lower end and having a combustion passageway extending longitudinally through it from its upper end to its lower end, said combustion passageway having an upper section, a lower section and a middle section, said upper section extending from said upper end of said casing to said middle section and having a constantly decreasing cross-sectional area from the upper end to said middle section, said lower section extending from said middle section to said lower end and having a constantly decreasing cross-sectional area from the middle section to the lower end, said middle section being located substantially midway between said upper end and lower end, said casing having a fuel inlet opening extending through it located substantially in the middle of said upper section and a relief exit opening extending through it located at said middle section;

an upper sleeve means lining the upper section of each of said combustion casings, said upper sleeve having an opening through it aligned with and connected to said fuel inlet opening;

a lower sleeve means lining the lower section of each combustion casing;

an upper tubular member located in the upper section of each combustion casing in spaced relationship within each upper sleeve means, each upper tubular member having a closed upper end adjacent the upper end of each casing and an open lower end adjacent each middle section, each upper tubular member being perforated;

a plurality of radial arms located adjacent the upper end of each combustion casing within each upper section and extending from each upper sleeve means to each upper tubular member and a plate located at the open lower end of each upper tubular member between said upper sleeve means and said upper tubular member;

an upper electrical wire wrapped about each upper tubular member;

means for supplying electrical energy to each upper electrical wire;

a lower tubular member located in each lower section in spaced relationship within said lower sleeve means, each lower tubular member having an open upper end adjacent said middle section and an open lower end adjacent the lower end of said casing, said open upper end of said lower tubular member being flared outwardly and engaging each combustion casing and each lower sleeve means;

a plate located on the lower end of each combustion casing and extending from the open lower end of each lower tubular member across each lower sleeve means;

a lower electrical wire wrapped about each lower tubular member;

means for supplying electrical energy to each lower electrical wire;

compressor means mounted within said turbine enclosure assembly for supplying pressurized air to said combustion assemblies;

a pumping assembly for supplying pressurized fuel for said preheater assembly, said preheater assembly including means to preheat the pressurized fuel to a temperature below its flash point temperature at the ambient pressure of said pressurized fuel, each of said combustion assemblies including means for the further heating of said pressurized fuel to at least its flash point temperature to support combustion of the fuel in combination with the pressurized air supplied to said combustion assemblies;

means for conveying said pressurized fuel from said pumping assembly to said preheater assembly;

means for conveying pressurized fuel from said preheater assembly to said plurality of combustion assemblies;

a drive shaft means rotatably mounted within said turbine enclosure assembly, said compressor means being driven by said drive shaft means;

an impeller means mounted on said drive shaft means; and a plurality of manifold and nozzle means each connected to a combustion assembly and mounted within said turbine enclosure assembly to receive the pressurized gaseous products of combustion from said plurality of combustion assemblies and direct said gaseous products of combustion against said impeller means to cause said impeller means to drive said drive shaft means.

4. A gas turbine comprising:

a turbine enclosure assembly;

a preheater assembly;

a plurality of combustion assemblies mounted within and supported by said turbine enclosure assembly;

compressor means mounted within said turbine enclosure assembly for supplying pressurized air to said combustion assemblies;

a relief valve assembly connected to said plurality of combustion assemblies and to said compressor means, said relief valve assembly being adapted to divert said pressurized air to atmosphere when a predetermined pressure occurs within said plurality of combustion assemblies;

a pumping assembly for supplying pressurized fuel for said preheater assembly, said preheater assembly including means to preheat the pressurized fuel to a temperature below its flash point temperature at the ambient pressure of said pressurized fuel, each of said combustion assemblies including means for the further heating of said pressurized fuel to at least its flash point temperature to support combustion of the fuel in combination with the pressurized air supplied to said combustion assemblies;

means for conveying said pressurized fuel from said pumping assembly to said preheater assembly;

means for conveying pressurized fuel from said preheater assembly to said plurality of combustion assemblies;

a drive shaft means rotatably mounted within said turbine enclosure assembly, said compressor means being driven by said drive shaft means;

an impeller means mounted on said drive shaft means; and a plurality of manifold and nozzle means each connected to a combustion assembly and mounted within said turbine enclosure assembly to receive the pressurized gaseous products of combustion from said plurality of combustion assemblies and direct said gaseous products of combustion against said impeller means to cause said impeller means to drive said drive shaft means.

5. A gas turbine according to claim 4 wherein said relief valve assembly includes means to stop said pumping assembly when said predetermined pressure occurs.

6. A gas turbine according to claim 3 wherein said preheater assembly includes:

a preheater casing having an opening extending longitudinally through it;

a hollow perforated tubular member closed at one end and opened at the other end;

means for suspending said hollow tubular perforated member within the opening of said preheater casing to direct said fuel flow about the outside of and through said perforated hollow tubular member and out the opened end thereof;

an electrical heating wire wrapped about said hollow perforated tubular member; and means for supplying electrical energy to said heating wire to produce heat for heating the pressurized fuel.

7. A gas turbine according to claim 6 further including a relief valve assembly, said relief valve assembly including:

a relief valve enclosure;

means connecting said compressor means to said relief valve enclosure conveying said compressed air to said relief valve enclosure;

header means connecting said plurality of combustion assemblies with said relief valve enclosure conveying said products of combustion from said pressurized fuel within said plurality of combustion assemblies to said relief valve assembly;

valve means mounted in said relief valve enclosure in the path of flow of the compressed air from said compressor means;

spring means mounted on said valve means forcing said valve means open;

cam means engaging said valve means to close said valve means; and piston means in said relief valve enclosure in the path of flow of the products of combustion from the plurality of combustion assemblies, said piston means being operatively associated with said cam means to release said valve means when a predetermined pressure occurs in said plurality of combustion assemblies.

8. A gas turbine comprising:

a turbine enclosure assembly;

a preheater assembly;

a plurality of combustion assemblies mounted within and supported by said turbine enclosure assembly;

compressor means mounted within said turbine enclosure assembly for supplying pressurized air to said combustion assemblies;

a pumping assembly for supplying pressurized fuel for said preheater assembly, said preheater assembly including means to preheat the pressurized fuel to a temperature below its flash point temperature at the ambient pressure of said pressurized fuel, each of said combustion assemblies including means for the further heating of said pressurized fuel to at least its flash point temperature to support combustion of the fuel in combination with the pressurized air supplied to said combustion assemblies;

means connected to both said pumping casing and said preheater assembly for conveying said pressurized fuel from said pumping assembly to said preheater assembly, said means for conveying including a valve casing with an inlet valve and seat adjacent said pumping casing and an exit valve and seat adjacent said preheater assembly;

means for conveying pressurized fuel from said preheater assembly to said plurality of combustion assemblies; and a drive shaft means rotatably mounted within said turbine enclosure assembly, said compressor means being driven by said drive shaft means, said drive shaft means including an upper drive shaft and a lower drive shaft, said upper drive shaft and said lower drive shaft each being independently rotatably mounted in said turbine enclosure assembly on a common longitudinal axis.

9. A gas turbine according to claim 8 wherein said impeller means includes an upper impeller mounted on said upper shaft and a lower impeller mounted on said lower shaft.

10. A gas turbine according to claim 9 wherein said compressor means is driven by said upper shaft and further including a hydraulic pump, said hydraulic pump being driven by said lower shaft.

11. A gas turbine according to claim 10 including a means for controlling the speed of rotation of said lower shaft, said means for controlling including:
- a pair of preset marks located on said impeller;
- electrical means responsive to the movement of said pair of preset marks; and
- means actuated by said electrical means for controlling the amount of heat supplied to said fuel in said preheater assembly and in said combustion assembly.

* * * * *